Figure 1:
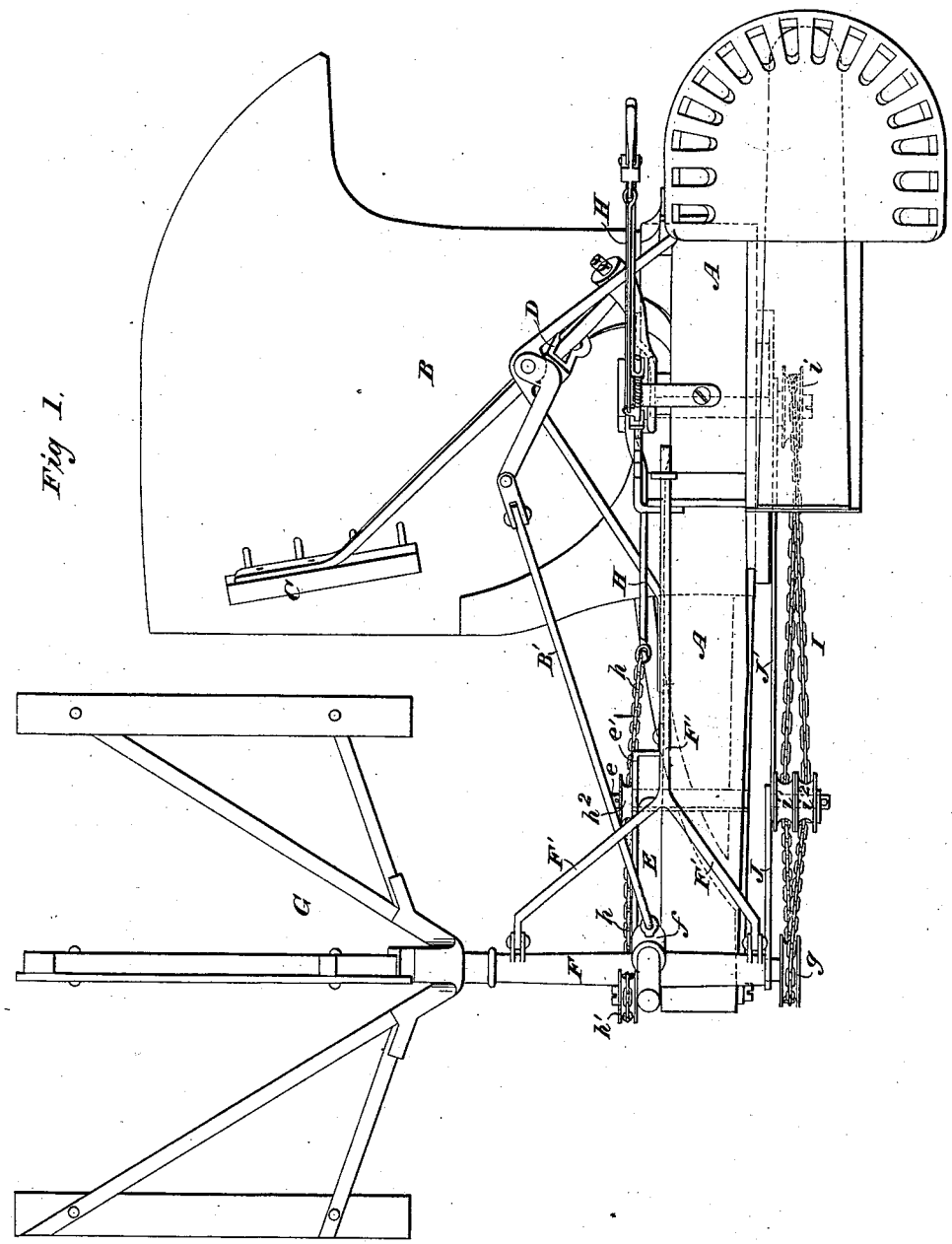

E. WILCOX.
HARVESTER-RAKE.

No. 187,075. Patented Feb. 6, 1877.

4 Sheets—Sheet 1.

WITNESSES.                INVENTOR.
                          Elihu Wilcox.
        By his Attorneys,

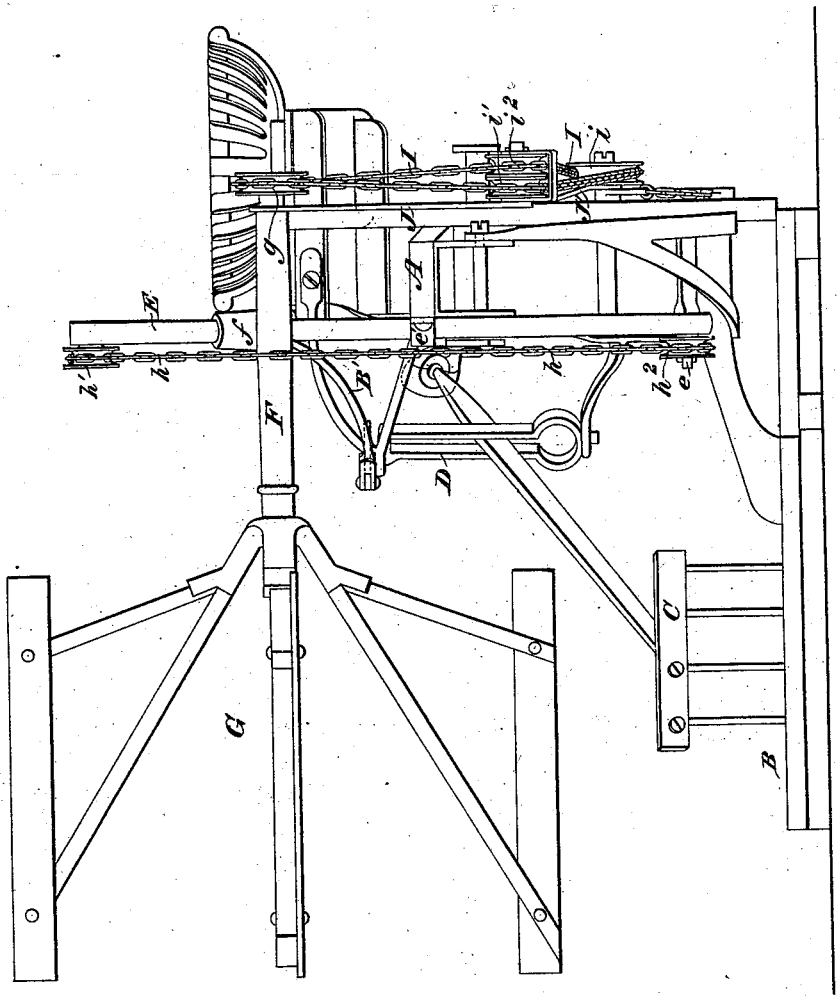

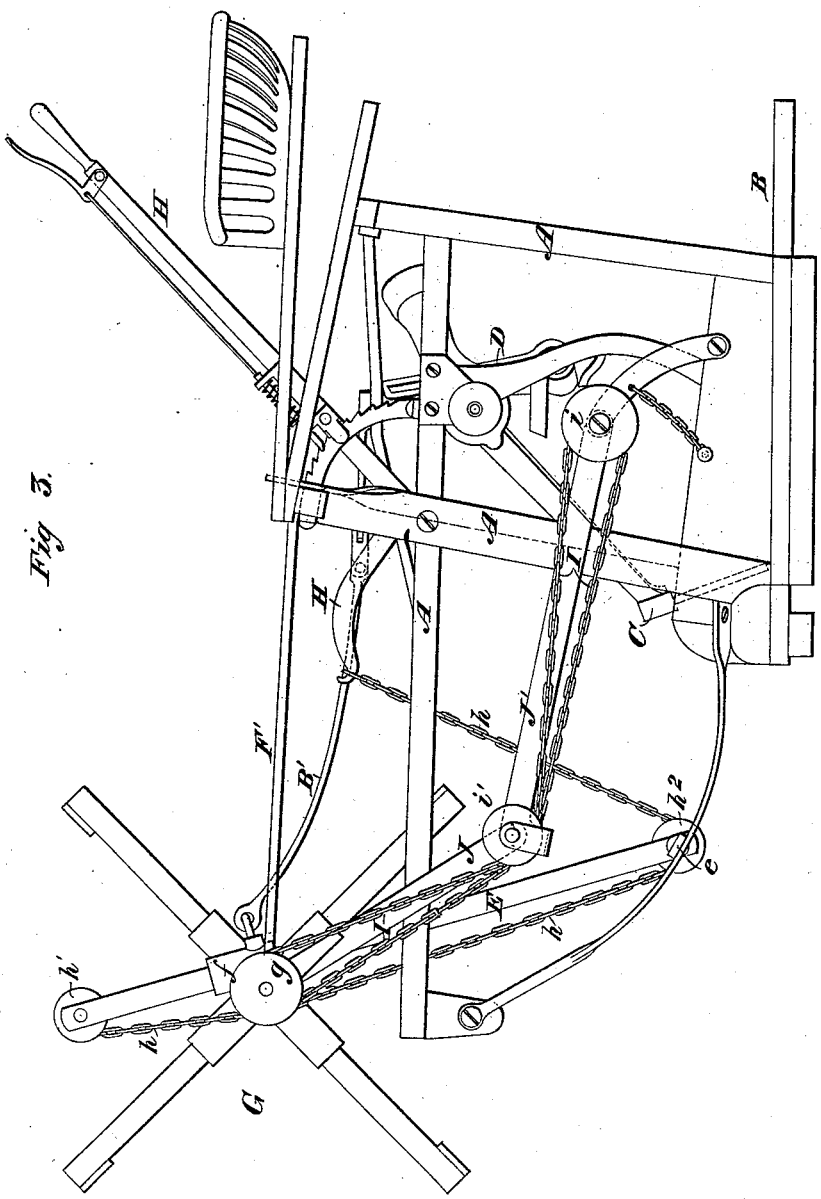

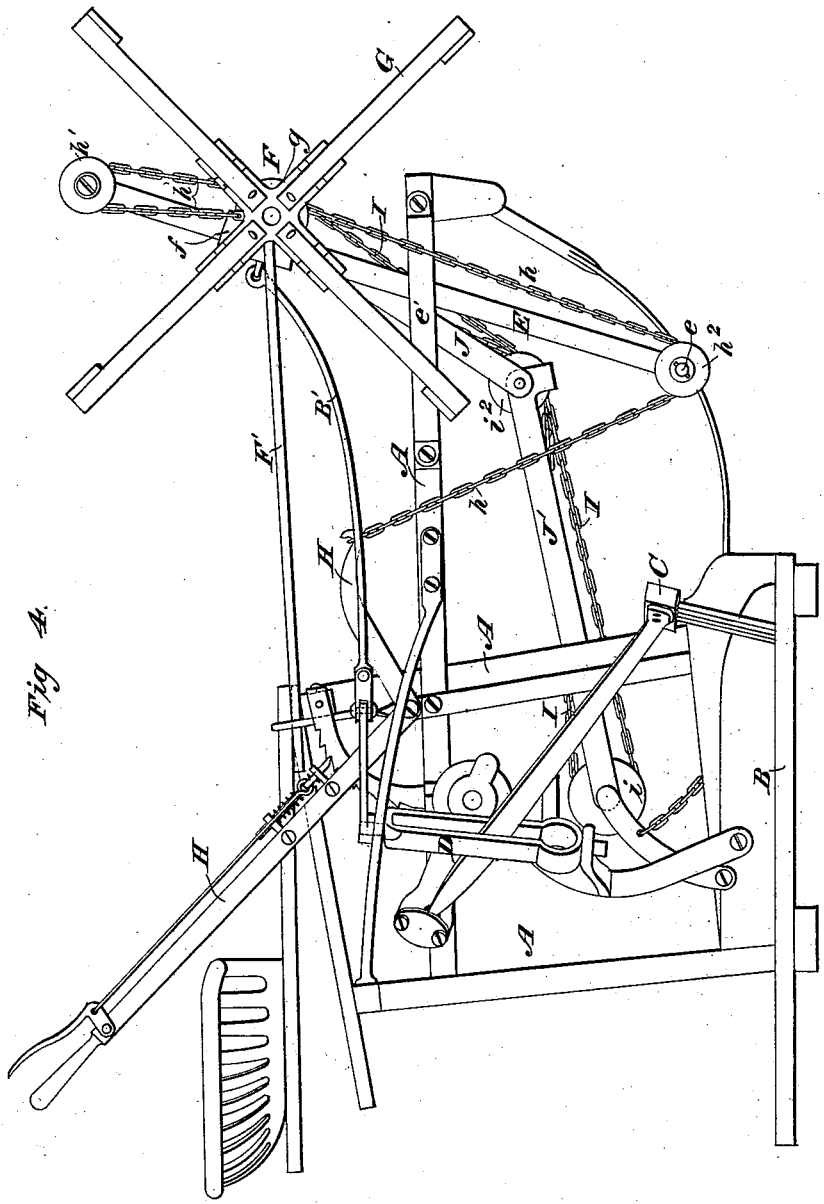

UNITED STATES PATENT OFFICE.

ELIHU WILCOX, OF BROCKPORT, NEW YORK, ASSIGNOR TO DAYTON S. MORGAN, OF SAME PLACE.

IMPROVEMENT IN HARVESTER-RAKES.

Specification forming part of Letters Patent No. 187,075, dated February 6, 1877; application filed October 27, 1876.

*To all whom it may concern:*

Be it known that I, ELIHU WILCOX, of Brockport, in the county of Monroe and State of New York, have invented certain new and useful Improvements in Harvesters, of which the following is a specification:

The first part of my invention relates to an automatically-vibrating reel and its adjusting mechanism. Its object is to enable the driver on the machine readily to adjust the reel vertically during the vibratory movements positively imparted thereto; to which end the improvement consists in the combination of an automatically-vibrated reel post or standard, rocking upon a pivot at its lower end bearings, in which the reel is mounted, movable up and down upon the post, pulleys on the post, one above the reel-bearing, and the other mounted on or in the axial line of the pivot on which the post vibrates, a chain secured at one end to the reel-bearing, and a lever and detent mounted on the frame of the machine, to which lever the opposite end of the chain is secured after being passed round the pulleys, whereby the driver is enabled to raise, lower, or retain the reel at any desired elevation without interfering with the automatic vibrations of the reel, by which it is caused to move forward out of the way of the rake, as the latter advances, and then to move backward as the rake retracts, to reel the grain into the cutters.

My improvement further consists in combining a reel, constructed and operating as above described, with a vibrating sweep-rake, by suitable link-connections, in such manner that the reel shall vibrate in unison with the rake, so as to move forward out of the way of the rake in its advancing movement, and into the standing grain, in advance of the cutters, and then to move backward as the rake retracts, to reel the grain into the cutters.

My invention further consists in a novel device for continuing the rake and reel in a uniform relation to each other, notwithstanding the vertical movement of the reel.

In the accompanying drawings my improvements are shown as adapted to a fully-organized harvester, resembling in its general construction the machine shown in Letters Patent No. 135,731, granted February 11, 1873, to Seymour and Morgan; and, as said machine is fully described and shown in the patent aforesaid, it is deemed sufficient here to describe those parts only constituting the subject-matter hereinafter claimed.

Figure 1 represents a plan or top view of so much of my improved machine as is necessary to illustrate the subject-matter herein claimed, showing the reel and rake in their advanced positions. Fig. 2 represents a front elevation of the same. Fig. 3 represents an elevation of one side; and Fig. 4 an elevation of the opposite side of the machine.

The main frame A and platform B are supported upon suitable wheels, and carry driving-gearing of well-known construction. A vibrating sweep-rake, C, moves endwise through slotted oscillating posts D, as described in the patent aforesaid. A post or standard, E, vibrates upon a pivot, $e$, and moves in a guide, $e'$, parallel with the path of the machine. A long pipe-box bearing, F, is provided with a transverse collar or sleeve, $f$, which fits and slides freely up and down on the reel-post E, being guided and braced by a sliding brace, F', as in the Seymour and Morgan patent above mentioned. A pivoted link, B', connects this pipe-box bearing with a crank on the slotted turning-post D of the rake in order to insure the coincidence of movement of the rake and reel G, which revolves in said pipe-box bearings.

In order to enable the driver readily to raise and lower the reel while the machine is in operation, this pipe-box bearing is suspended by a chain, $h$, passing over a pulley, $h^1$, on the top of the reel-post, around a corresponding pulley, $h^2$, on the pivot of said post, thence to a hand-lever, H, rocking upon a suitable fulcrum on the main frame within reach of the driver, in a well-known way.

I am aware that various means of raising and lowering the reel of a harvester in operation have heretofore been devised, and do not, therefore, broadly claim this feature; but I am not aware of the reel of a harvester having been raised or lowered from the driver's seat by means of a chain passing over pulleys upon a pivoted reel-support, and moving the reel-bearings independently of the reel-supporting standard, and without interfering with the free vibrating movements thereof, which plan is very convenient in connection with a vibrating reel-post, such as I employ, caused to move in unison with the rake.

The reel is driven by a chain, I, passing from a sprocket-wheel, $i$, on a driving-shaft, under pulleys $i^1$ $i^2$, mounted at the junction of two link-bars, J J', pivoted respectively to the driving-shaft and to the reel-bearing, and thence around a sprocket-wheel, $g$, on the reel-shaft.

As by this mode of construction one side of the chain will always remain slack, while the driving side necessarily remains taut, the reel can be raised or lowered to any extent without interruption to its working, as is well understood.

It will be observed that the link which connects the crank of the slotted oscillating rake-post, with the vibrating reel-post is pivoted directly to the pipe-box bearing of the reel-shaft, instead of being connected directly to the post, as in the Seymour and Morgan patent, above mentioned, as a consequence of which arrangement the rake and reel are held at an invariable distance apart notwithstanding the vertical adjustment of the reel, which is found advantageous in practice.

What I claim as my invention, and desire to secure by Letters Patent, is—

1. The combination of the automatically-vibrating reel-post, rocking upon a pivot at its lower end, the sliding reel-bearing, the reel mounted in said bearing, the two pulleys located the one at the top of the post and the other on the pivot on which the post vibrates, the lifting-chain attached at one end to the reel-bearing, and passing around the pulleys, and the lever mounted on the frame of the machine, and to which the other end of the chain is attached, these members being constructed and operating substantially as hereinbefore set forth, whereby the automatic vibrations of the reel-post admit of the unimpeded working of the rake while not interfering with the free vertical adjustment of the reel.

2. The combination, substantially as hereinbefore set forth, of the vibrating sweep-rake, the adjustable reel, its pivoted post, the reel-adjusting mechanism, and connections between the reel and rake, maintaining their relative positions irrespective of any adjustment of the former, whereby the uniformity of vibration and coincidence of movement of the reel and rake are insured, while leaving the reel free to be raised or lowered by the driver, as set forth.

3. The combination, substantially as hereinbefore set forth, of the oscillating rake-post, the oscillating reel-post, the reel-bearing adjustable thereon, and the link connecting the crank of the rake-post directly with the reel-bearing, whereby the reel and rake maintain their relation to each other, notwithstanding vertical adjustment of the reel.

In testimony whereof I have hereunto subscribed my name.

ELIHU WILCOX.

Witnesses:
E. T. LAMB,
E. P. JOSLYN.